United States Patent
Egilmez et al.

(10) Patent No.: US 11,503,292 B2
(45) Date of Patent: Nov. 15, 2022

(54) METHOD AND APPARATUS FOR ENCODING/DECODING VIDEO SIGNAL BY USING GRAPH-BASED SEPARABLE TRANSFORM

(71) Applicants: LG ELECTRONICS INC., Seoul (KR); UNIVERSITY OF SOUTHERN CALIFORNIA, Los Angeles, CA (US)

(72) Inventors: Hilmi E. Egilmez, Los Angeles, CA (US); Yung-Hsuan Chao, Los Angeles, CA (US); Antonio Ortega, Los Angeles, CA (US); Bumshik Lee, Seoul (KR); Sehoon Yea, Seoul (KR)

(73) Assignees: LG Electronics Inc., Seoul (KR); University of Southern California, Los Angeles, CA (US)

( * ) Notice: Subject to any disclaimer, the term of this patent is extended or adjusted under 35 U.S.C. 154(b) by 404 days.

(21) Appl. No.: 16/074,372

(22) PCT Filed: Feb. 1, 2017

(86) PCT No.: PCT/KR2017/001050
§ 371 (c)(1),
(2) Date: Apr. 8, 2021

(87) PCT Pub. No.: WO2017/135661
PCT Pub. Date: Aug. 10, 2017

(65) Prior Publication Data
US 2021/0243441 A1     Aug. 5, 2021

Related U.S. Application Data

(60) Provisional application No. 62/289,911, filed on Feb. 1, 2016.

(51) Int. Cl.
*H04N 19/12* (2014.01)
*H04N 19/159* (2014.01)
(Continued)

(52) U.S. Cl.
CPC .......... *H04N 19/12* (2014.11); *H04N 19/159* (2014.11); *H04N 19/176* (2014.11); *H04N 19/61* (2014.11)

(58) Field of Classification Search
None
See application file for complete search history.

(56) References Cited

U.S. PATENT DOCUMENTS

| 9,565,451 B1* | 2/2017 | Mukherjee | ........... H04N 19/593 |
| 2017/0214943 A1* | 7/2017 | Cohen | .................. H04N 19/136 |

(Continued)

FOREIGN PATENT DOCUMENTS

| KR | 10-2009-0115176 A | 11/2009 |
| KR | 10-2011-0135787 A | 12/2011 |
| KR | 10-2014-0116194 A | 10/2014 |

OTHER PUBLICATIONS

Hu et al. "Multiresolution Graph Fourier Transform for Compression of Piecewise Smooth Images" (Year: 2015).*

(Continued)

*Primary Examiner* — Mohammed Jebari
(74) *Attorney, Agent, or Firm* — Dentons US LLP

(57) ABSTRACT

The present invention provides a method for encoding a video signal on the basis of a graph-based separable transform (GBST), the method comprising the steps of: generating an incidence matrix representing a line graph; training a sample covariance matrix for rows and columns from the rows and columns of a residual signal; calculating a graph Laplacian matrix for rows and columns on the basis of the incidence matrix and the sample covariance matrix for rows and columns; and obtaining a GBST by performing eigen decomposition of the graph Laplacian matrix for rows and columns.

8 Claims, 13 Drawing Sheets

(51) Int. Cl.
*H04N 19/176* (2014.01)
*H04N 19/61* (2014.01)

(56) References Cited

U.S. PATENT DOCUMENTS

2017/0359584 A1* 12/2017 Said ................... H04N 19/61
2018/0338143 A1* 11/2018 Fracastoro ............ H04N 19/12

OTHER PUBLICATIONS

Zhang et al. "Point cloud attribute compression with graph transform" (Year: 2014).*
Wang et al. "Intra predictive transform coding based on predictive graph transform" (Year: 2013).*
Hilmi E. Egilmez et al., "Graph-Based Transforms for Inter Predicted Video Coding", 2015 IEEE International Conference on Image Processing (ICIP), Sep. 27-30, 2015, pp. 1-5, see pp. 1-4.
Cha Zhang et al., "Analyzing the Optimality of Predictive Transform Coding Using Graph-Based Models", IEEE Signal Processing Letters, vol. 20, No. 1, Nov. 27, 2012, pp. 106-109, see pp. 106-109.

* cited by examiner (a)

| Dataset (Intra) | Separable KLT | | GBST | |
|---|---|---|---|---|
| | $\Delta$-rate(%) | $\Delta$-PSNR | $\Delta$-rate(%) | $\Delta$-PSNR |
| Training | -2.6104 | 0.2206 | -2.4013 | 0.2025 |
| Test | -1.4512 | 0.1071 | -1.9592 | 0.1425 |
| Dataset (Inter) | Separable KLT | | GBST | |
| | $\Delta$-rate(%) | $\Delta$-PSNR | $\Delta$-rate(%) | $\Delta$-PSNR |
| Training | -1.4864 | 0.0618 | -1.1100 | 0.0453 |
| Test | -0.2933 | 0.0143 | -0.4096 | 0.0182 |

FIG. 13

| Dataset (Intra) | Hybrid DCT/ADST | | GBST | |
|---|---|---|---|---|
| | $\Delta$-rate(%) | $\Delta$-PSNR | $\Delta$-rate(%) | $\Delta$-PSNR |
| Training | -6.2562 | 0.5173 | -7.9594 | 0.65677 |
| Test | -3.4526 | 0.3154 | -4.0840 | 0.3697 |

METHOD AND APPARATUS FOR ENCODING/DECODING VIDEO SIGNAL BY USING GRAPH-BASED SEPARABLE TRANSFORM

CROSS-REFERENCE TO RELATED APPLICATIONS

This application is the National Stage filing under 35 U.S.C. 371 of International Application No. PCT/KR2017/001050, filed on Feb. 1, 2017, which claims the benefit of U.S. Provisional Applications No. 62/289,911, filed on Feb. 1, 2016, the contents of which are all hereby incorporated by reference herein in their entirety.

TECHNICAL FIELD

The present invention relates to a method and apparatus for encoding and decoding a video signal using a graph-based separable transform (GBST). Specifically, the present invention relates to a technique of designing a separable transform based on a line graph having an optimal weight.

BACKGROUND ART

Next-generation video content will have features of high spatial resolution, a high frame rate, and high dimensionality of scene representation. Processing such content will result in a tremendous increase in terms of memory storage, a memory access rate, and processing power.

Therefore, there is a need to design a coding tool for processing next-generation video content more efficiently.

In particular, a graph is a data representation form useful for describing information about the relationship between pixels, and a graph-based signal processing method of performing processing by expressing information about the relationship between pixels in a graph form. Such graph-based signal processing may generalize concepts such as sampling, filtering, transform, and the like using a graph in which each signal sample is represented by a vertex, and in which relations of a signal is represented by a graph edge having a positive weight. Thus, a more efficient graph-based signal processing method is required not just in a video compression field, but a variety of application fields.

In addition, many image/video compression standards have adapted a Discrete Cosine Transform (DCT). Although the DCT has an advantage of a low complexity, the key problem of using a fixed block transform is that all residual blocks are assumed to have the same statistical properties. However, residual blocks are actually dependent on video content and prediction modes and thus they have very different statistical properties. Therefore, if it is possible to change transforms to fit the statistical properties of the residual blocks, better compression may be performed.

DISCLOSURE

Technical Problem

The present invention is to provide a method for designing a robust transform which uses a graph-based representation.

In addition, the present invention is to provide a graph-based separable transform which is based on a line graph having an optimal weight.

In addition, the present invention is to design a separable line graph based on row-wise and column-wise residual block statistics.

In addition, the present invention is to generate an optimal separable transform for a model of residual signals for intra prediction or inter prediction.

In addition, the present invention is to provide a method of generating an optimized transform which is applicable to a range of statistical graph models.

Technical Solution

The present invention provides a graph-based separable transform which is based on a line graph having an optimal weight.

In addition, the present invention is to provide a method of designing a separable line graph based on row-wise and column-wise residual block statistics.

In addition, the present invention provides a method of calculating a graph Laplacian matrix for rows and columns based on an incidence matrix and a sample covariance matrix for a row/column.

In addition, the present invention provides a method of using two different Gaussian Markov Random Fields (GMRFs) for modeling of a residual signal to estimate a generalized Laplacian matrix.

In addition, the present invention provides a method for generating an optimal graph-based separable transform (GBST) for a model of residual signals for intra prediction or inter prediction.

Advantageous Effects

The present invention provides a method of designing a robust transform which a graph-based representation, by which better compression is able to be performed.

The present invention provides a two-dimensional (2D) graph-based separable transform (GBST) based on a line graph having an optimal weight, thereby capable of outdoing performance of a two-dimensional Discrete Cosine Transform (DCT). and a separable Karhunen-Loeve transform (KLT). For example, compared to the separable KLT, the GBST to which the present invention is applied may require leaning much less parameters from training data, thereby driving a more robust transform.

In addition, compared to other transform methods, the GBST may provide a more robust and efficient generalized transform method for an intra prediction coding and an inter prediction coding.

DESCRIPTION OF DRAWINGS

FIG. 12 is a table in which a separable KLT and a graph-based separable GBST are compared with respect to residual signals of an intra prediction and an inter prediction according to one embodiment of the present invention.

FIG. 13 is a table in which a hybrid Discrete Cosine Transform (DCT)/Asymmetric Discrete Sine Transform (ADST) and a GBST are compared in terms of coding performance with respect to a residual signal of an intra prediction according to one embodiment of the present invention.

BEST MODE

Figure 1:
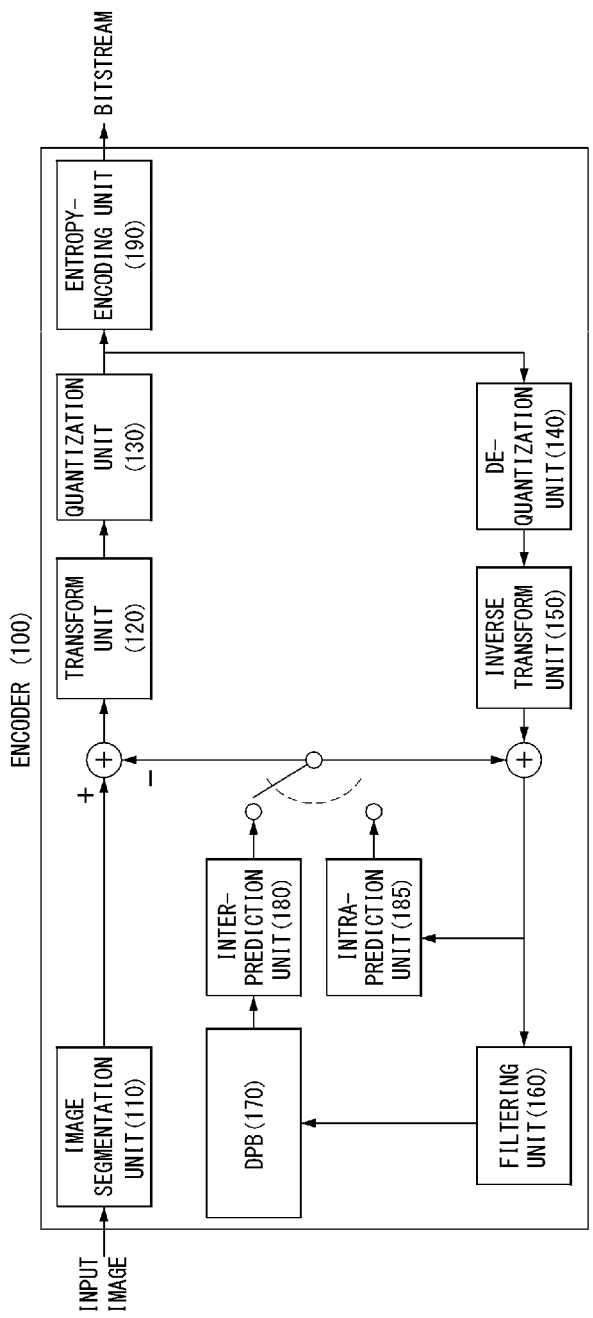
FIG. 1 shows a schematic block diagram of an encoder for encoding a video signal according to one embodiment of the present invention.

The present invention provides a method for encoding a video signal based on a graph-based separable transform (GBST), the method including: generating an incidence matrix corresponding to a line graph; training a sample covariance matrix for a row and a column from a row and a column of a residual signal; calculating a graph Laplacian matrix for a row and a column based on the incidence matrix and the sample covariance matrix for the row and the column; and obtaining the GBST by performing an eigen decomposition to the graph Laplacian matrix for the row and the column.

The graph Laplacian matrix for the rows and the columns may be defined by a link weighting parameter and a recursive loop parameter.

Two different Gaussian Markov Random fields (GMRFs) may be used for modeling of an inter residual signal and an intra residual signal.

In the case of the intra residual signal, a one-dimensional GMRF may include at least one of a distortion component of a reference sample, a Gaussian noise component of a current sample, or a spatial correlation coefficient.

In the case of the inter residual signal, a one-dimensional GMRF may include at least one of a distortion component of a reference sample, a Gaussian noise component of a current sample, a temporal correlation coefficient, or a spatial correlation coefficient.

In addition, the present invention provides a method for decoding a video signal based on a graph-based separable transform (GBST), the method including: extracting a residual signal from the video signal; performing an inverse-transform for the residual signal based on the GBST; and generating a reconstruction signal by adding the inverse-transformed residual signal to a prediction signal, wherein the GBST represents a transform generated based on line graphs, which are obtained by a Gaussian Markov Random Field (GMRF) modelling of rows and columns of the residual signal.

The GBST may be generated by the steps of: generating an incidence matrix corresponding to a line graph; training a sample covariance matrix for rows and columns from rows and columns of a residual signal; calculating a graph Laplacian matrix for rows and columns based on the incidence matrix and the sample covariance matrix for the rows and the columns; and obtaining a GBST by performing an eigen decomposition to the graph Laplacian matrix for the rows and the columns.

In addition, the present invention provides an apparatus for encoding a video signal based on a graph-based separable transform (GBST), the apparatus including: a graph generation unit configured to generate an incidence matrix corresponding to a line graph; and a GBST unit configured to train a sample covariance matrix for rows and columns from rows and columns of a residual signal, calculate a graph Laplacian matrix for rows and columns based on the incidence matrix and the sample covariance matrix for the rows and the columns, and obtain the GBST by performing an eigen decomposition to the graph Laplacian matrix for the rows and the columns.

In addition, the present invention provides an apparatus for decoding a video signal based on a graph-based separable transform (GBST), the apparatus including: a parsing unit configured to extract a residual signal from the video signal; an inverse transform unit configured to perform inverse transform on the residual signal based on the GBST; and a reconstruction unit configured to generate a reconstruction signal by adding the inverse-transformed residual signal and a prediction signal, wherein the GBST corresponds to a transform generated based on line graphs which are obtained by GMRF modeling of rows and columns of the residual signal.

MODE FOR THE INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

Further, partitioning, decomposition, splitting, and split, etc. may also be appropriately substituted with each other for each coding process.

FIG. 1 shows a schematic block diagram of an encoder for encoding a video signal, according to one embodiment of the present invention.

Referring to FIG. 1, the encoder 100 may include an image segmentation unit 110, a transform unit 120, a quantization unit 130, a de-quantization unit 140, an inverse transform unit 150, a filtering unit 160, a decoded picture buffer (DPB) 170, an inter prediction unit 180, an intra prediction unit 185, and an entropy encoding unit 190.

The image segmentation unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square or to a block of a variable size other than a square.

The transform unit 120 may employ a graph-based signal processing method of performing processing by expressing information about a relationship between pixels in a graph form. For example, the transform unit 120 may include a graph-based transform (GBT) unit, and the graph-based transform unit may generate an incidence matrix corresponding to a line graph, train a sample covariance matrix for a row and a column from a row and a column of a residual signal, calculate a graph Laplacian matrix for a row and a column based on the incidence matrix and the sample covariance matrix for the row and the column, and obtain a graph-based separable transform (GBST) by performing an eigen decomposition to the graph Laplacian matrix for the row and the column.

An embodiment of the present invention provides a GBST based on a line graph having an optimal weight.

An embodiment of the present invention provides a method of designing a separable line graph based on row-wise and column-wise residual block statistics.

An embodiment of the present invention provides a method of calculating a graph Laplacian matrix for a row and a column based on an incidence matrix and a sample covariance matrix for the row and the column.

An embodiment of the present invention provides a method of employing two different Gaussian Markov Random Fields (GMRFs) to model a residual signal for estimating a generalized Laplacian matrix.

An embodiment of the present invention provides a method of generating an optimal GBST for a model of each residual signal for intra prediction or inter prediction.

In another example, the transform unit 120 may include a graph-based transform (GBT) unit, and the graph-based transform unit may generate at least one data cluster for video data, generate at least one graph Laplacian matrix corresponding to the generated graph Laplacian matrix, and generate an optimum transform matrix by performing a transform optimization based on multiple graph-based models containing the generated graph Laplacian matrix.

The graph-based transform unit to which the present invention is applied may be embodied as a separate functional unit, in this case, the graph-based transform unit may be located in front of the transform unit 120, however, the present invention is not limited thereto.

The quantization unit 130 may quantize the transform coefficient and transmits the quantized coefficient to the entropy encoding unit 190. The entropy encoding unit 190 may entropy-code the quantized signal and then output the entropy-coded signal as bit streams.

The quantized signal output by the quantization unit 130 may be used to generate a prediction signal. For example, the quantized signal may be subjected to a de-quantization and an inverse transform via the de-quantization unit 140 and the inverse transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

The intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter prediction unit 180 or the intra prediction unit 185 may be used to generate the reconstructed signal or used to generate the residual signal.

Figure 2:
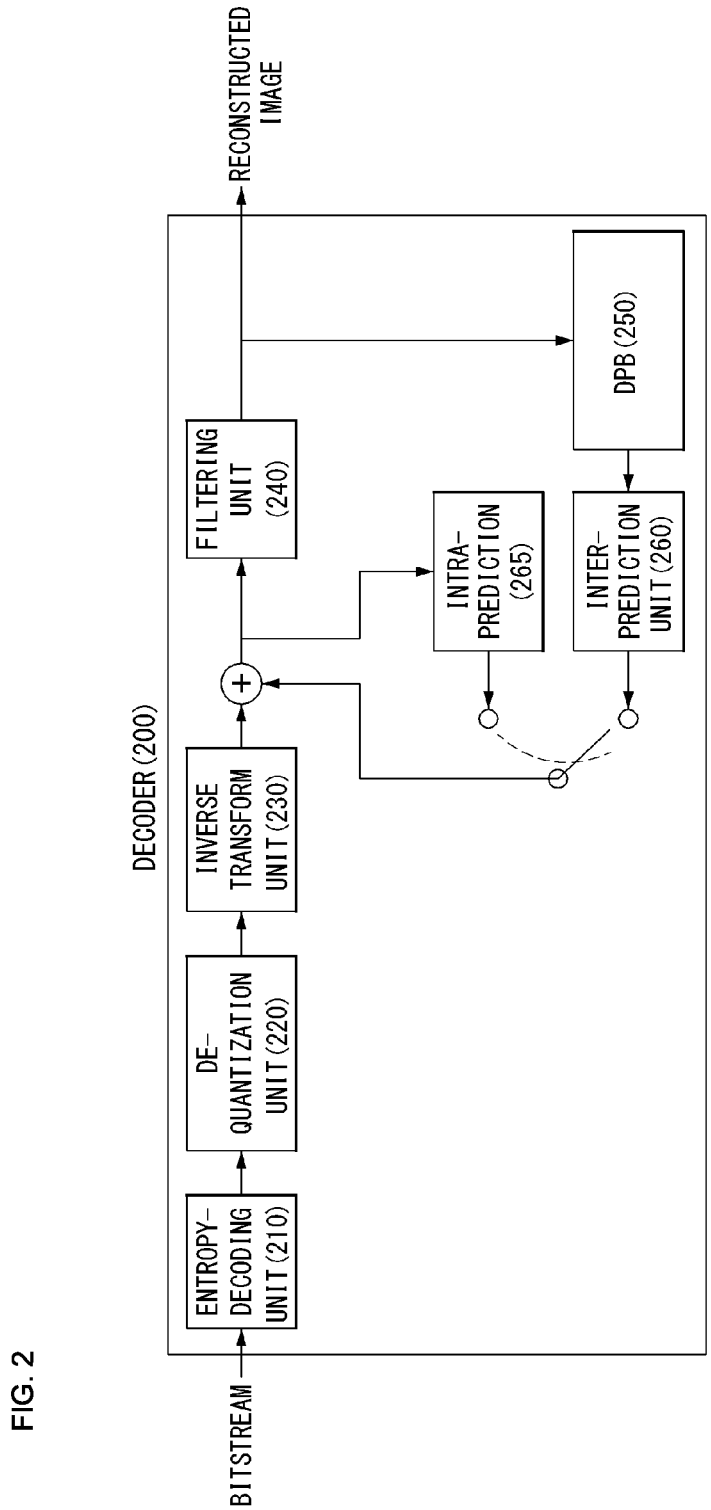
FIG. 2 shows a schematic block diagram of a decoder for decoding a video signal according to one embodiment of the present invention.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a de-quantization unit 220, an inverse transform unit 230, a filtering unit 240, a decoded picture buffer (DPB) 250, an inter prediction unit 260, an intra prediction unit 265 and a reconstruction unit (not shown).

A reconstructed video signal output by the decoder 200 may be reproduced using a reproducing device.

The decoder 200 may receive the signal output by the encoder as shown in FIG. 1. The received signal may be entropy-decoded via the entropy decoding unit 210.

According to one embodiment of the present invention, the decoder or the entropy decoding unit 210 may receive a mode index. In this case, the mode index may correspond to a transform matrix which is optimized based on multiple graph-based models. For example, the mode index may represent a DCT matrix or an EA-GBT matrix.

The mode index may be entropy-decoded through the entropy decoding unit 210, and used for inverse transform in the inverse transform unit 230.

However, the present invention is not limited thereto, and, for example, the mode index may not be an essential element for decoding in the present invention.

The de-quantization unit 220 obtains a transform coefficient from an entropy-decoded signal using quantization step size information. In this case, the obtained transform coefficient may be what the various embodiments described with regard to the transform unit 120 in FIG. 1 have been applied.

The inverse transform unit 230 may obtain a residual signal by inverse transforming the transform coefficient. For example, a GBST may be used for the inverse transform, and the GBST may be a transform which is generated based on line graphs which are obtained by Gaussian Markov Random Field (GRMF) modeling of rows and columns of a residual signal.

A reconstructed signal may be generated by adding the obtained residual signal to the prediction signal output by the inter prediction unit 260 or the intra prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

Herein, detailed descriptions for the filtering unit 160, the inter prediction unit 180 and the intra prediction unit 185 of the encoder 100 may be equally applied to the filtering unit 240, the inter prediction unit 260 and the intra prediction unit 265 of the decoder 200 respectively.

Figure 3:
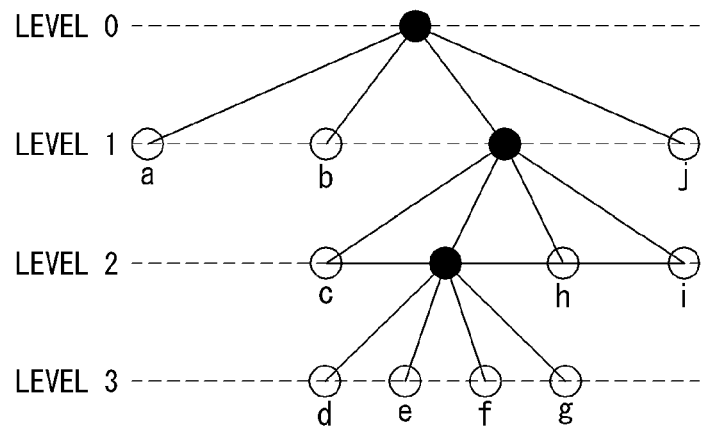
FIG. 3 is a diagram for illustrating a split structure of a coding unit according to one embodiment of the present invention.
Figure 3:
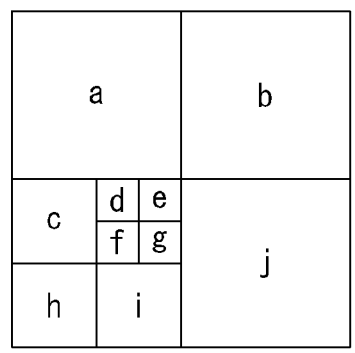

FIG. 3 is a diagram for illustrating a split structure of a coding unit, according to one embodiment of the present invention.

The encoder may split or divide one image or picture into a rectangular coding tree unit (CTU). Thereafter, the encoder may sequentially encode CTUs one by one according to the raster scan order.

For example, the size of a CTU may be set to 64×64, 32×32 or 16×16, but the present invention is not limited thereto. The encoder may select the size of a CTU based on resolution of an input image or the characteristics of an input image. A CTU may include a coding tree block (CTB) for a luma component and a coding tree block (CTB) for corresponding two chroma components.

A single CTU may be decomposed into a quad-tree (hereinafter referred to as a "QT") structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for the coding process of an input image, for example, a base unit for intra/inter-predictions. The CU may include a CB for a luma component and a CB for two chroma components corresponding to the luma component. For example, the size of the CU may be set to 64×64, 32×32, 16×16 or 8×8. However, the present invention is not limited thereto. In the case of a high-resolution image, the size of the CU may be increased or varied.

Referring to FIG. 3, the CTU may correspond to the root node, and may have the smallest depth (i.e., level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(*b*), each of the coding units CU(a), CU(b), and CU(j) corresponding to nodes a, b and j, respectively, is split in a CTU once, thus having a depth of level 1.

At least one of sub-nodes; each one having a depth of level 1 may be further split into a QT form. Among the sub-nodes, each having a depth of level 2, a sub-node (i.e., a leaf node) that is not further divided corresponds to a CU. For example, in FIG. 3(*b*), each of the coding units CU(c), CU(h), and CU(i) corresponding to nodes c, h and i respectively are partitioned two times in the CTU and thus has a depth of level 2.

Further, among the sub-nodes, each having a depth of level 2, at least one sub-node may be further split into a QT form. Among the sub-nodes, each having a depth of level 3, a sub-node (i.e., a leaf node) that is not further divided corresponds to a CU. For example, in FIG. 3(b), each of the coding units CU(d), CU(e), CU(f) and CU(g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag." The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

In the embodiment shown in FIG. 3, although the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8 or 4×4. However, the present invention is not limited thereto. For high-resolution images, the size of a TU may be larger or may vary.

For a single TU, information indicating whether or not the TU is divided may be transmitted to the decoder. For example, the information may be defined as a split transform flag and may be represented by a syntax element "split_transform_flag".

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, a CU is a base unit for the coding process in which the intra-prediction or inter-prediction is performed. In order to more effectively code the input image, the CU may be divided into PUs (Prediction Units).

A PU is a base unit forming a prediction block. It is possible to generate different prediction blocks on a PU basis even within a single CU. The PU may be divided differently depending on whether an intra-prediction mode or an inter-prediction mode is used as a coding mode for a CU to which the PU belongs.

Figure 4:
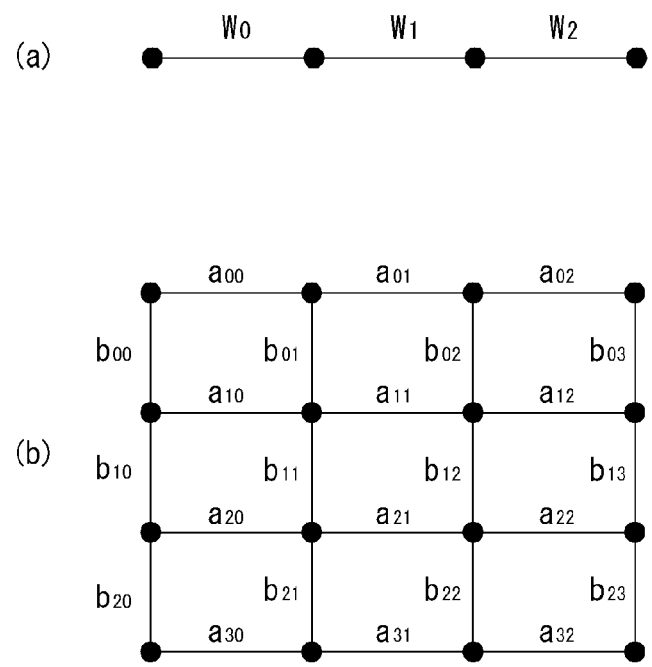
FIG. 4 is a diagram for illustrating a process of obtaining a graph-based transform matrix based on a one-dimensional graph and a two-dimensional graph according to one embodiment of the present invention.

FIG. 4 is a diagram for illustrating a process of obtaining a graph-based transform matrix based on a one-dimensional graph and a two-dimensional graph, according to one embodiment of the present invention.

In an embodiment of the present invention, graph types that may be used to process a pixel block in an image may be described with reference to FIG. 4. For example, FIG. 4(a) indicates a one-dimensional graph corresponding to each line of the pixel bloc, while FIG. 4(b) indicates a two-dimensional graph corresponding to the pixel block.

A graph vertex may be associated with each pixel in the pixel block, and a value of the graph vertex may be represented by a pixel value. Further, a graph edge may mean a line connecting the graph vertexes. The graph edge may be used to indicate what form statistical dependence in the signal has. A value representing an intensity of the statistical dependence may be called an edge weight.

For example, referring to FIG. 4(a) which indicates the one-dimensional graph, 0, 1, 2, and 3 represent positions of the vertexes respectively, and $w_0$, $w_1$, and $w_2$ represent weights of edges between the vertexes respectively.

Referring to FIG. 4(b) which indicates the two-dimensional graph, $a_{ij}$ (i=0,1,2,3, j=0,1,2) and $b_{kl}$ (k=0,1,2, l=0,1,2,3) represent weights of edges between the vertexes respectively.

Each vertex may be connected to any other vertexes, an edge weight of zero may be non-associated or assigned to an edge that connects weakly-associated vertices. However, for simplicity of representation, an edge with the edge weight of zero may be completely eliminated.

Definition of Graph-Based Transform (GBT)

In an embodiment of the present invention, a transform obtained from a graph signal may be defined as a graph-based transform (hereinafter referred to as a "GBT"). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph.

In this case, the GBT may be obtained through a following process. For example, the encoder or decoder may obtain graph information from a target block in a video signal. When a weighted graph g (A,S) is given, a Laplacian matrix may be obtained from the graph information, as in Equation 1 as below.

$$L = D - A + V \quad \text{[Equation 1]}$$

In the above Equation 1, D denotes a degree matrix, and, for example, the degree matrix may mean a diagonal matrix including information on a degree of each vertex. A denotes an adjacency matrix which indicates a connection relationship (e.g., an edge) with an adjacent pixel. V denotes a diagonal matrix which represents a self-loop on nodes of G.

In addition, a GBT kernel may be obtained by performing an eigen decomposition to a Laplacian matrix L, as in Equation 2 as below.

$$L=U\Lambda U^T \quad \text{[Equation 2]}$$

In the above Equation 2, L denotes a Laplacian matrix, U denotes an eigen matrix, $\Lambda$ denotes a diagonal eigenvalue matrix, and $U^T$ denotes a transpose matrix of U. In the above Equation 2, the eigen matrix U may provide a graph-based fourier transform which is specialized for a signal suitable for a corresponding graph model. For example, an eigen matrix U satisfying the above Equation 2 may mean a GBT kernel.

In this case, columns of the eigen matrix may mean basis vectors of a GBT. If a graph does not have a self-loop, the Laplacian matrix may be the same as when V=0 in Equation 1.

Definition of Graph-Based Separable Transform (GBST)

In the present invention, a GBST may be defined using GBTs which are derived from a generalized graph Laplacian matrix of weighted line graphs.

If $U_{row}$ and $U_{col}$ are a (N×N) basis matrix of a GBT, $U_{row}$ and $U_{col}$ may be applied to each row and each column of a (N×N) block X. In this case, the block X may be represented as in Equation 3 as below.

$$\hat{X}=U_{col}{}^t X U_{row} \quad \text{[Equation 3]}$$

In this case, $\hat{X}$ denotes a GBST of the block X, $U_{row}$ and $U_{col}$ denote basis matrixes of a GBT for each row and each column of the (N×N) block X, and $U_{col}{}^t$ denotes a transpose matrix of $U_{col}$.

Figure 5:
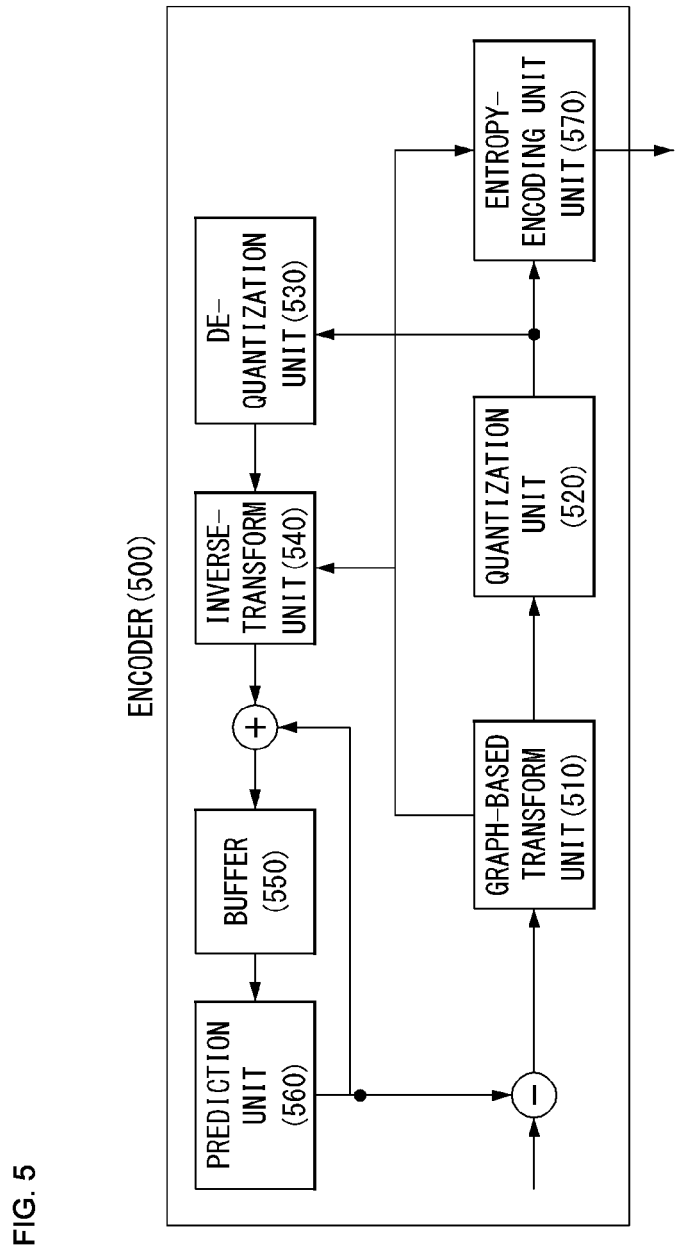
FIG. 5 illustrates a schematic block diagram of an encoder that processes graph-based signals, according to one embodiment of the present invention.

FIG. 5 is an embodiment in which the present invention is applied, and illustrates a schematic block diagram of an encoder which performs a graph-based signal processing.

In a video coding structure as shown in FIGS. 1 and 2, a fixed transform such as DCT may be used. DCT has a problem for using a fixed block transform despite low complexity thereof. It means that DCT is performed on the assumption that every residual signal has the same isotropic statistical properties. However, since residual blocks are actually dependent on video content and prediction modes and thus they have very different statistical properties depending on, it is necessary to adaptively change the statistical properties of the residual blocks.

The present invention proposes a new framework to design a GBST based on an optimal line graph. First, two separable line graphs may be generated based on row-wise and column-wise statistical properties observed in each prediction mode. Then, a GBST may be generated using a GBT corresponding to the two separable line graphs, that is, by applying the GBT to rows and columns of the residual blocks.

Referring to FIG. 5, an encoder 500 to which the present invention is applied includes a graph-based transform unit 510, a quantization unit 520, an inverse-quantization unit 530, an inverse transform unit 540, a buffer 550, a prediction unit 560, and an entropy encoding unit 570.

The encoder 500 receives a video signal, and generates a residual signal by subtracting a prediction signal, which is output from the prediction unit 560, from the video signal.

The generated residual signal is transmitted to the graph-based transform unit 510, and the graph-based transform unit 510 may generate a transform coefficient by applying a transform method to the residual signal.

For example, the graph-based transform unit 510 may generate two separable line graphs based on row-wise and column-wise statistical properties of residual blocks. Then, a GBST may be generated using a GBT corresponding to the two separable line graphs, that is, by applying the GBT to rows and columns of the residual blocks.

The quantization unit 520 quantizes the generated GBST coefficient, and transmits the quantized coefficient to the entropy encoding unit 570.

The entropy encoding unit 570 may perform entropy coding on the quantized signal and output an entropy-coded signal.

The quantized signal output by the quantization unit 520 may be used to generate a prediction signal. For example, the de-quantization unit 530 and the inverse transform unit 540 in the loop of the encoder 500 may perform inverse quantization and inverse transform on the quantized signal so that the quantized signal is reconstructed as a residual signal. A reconstructed signal may be generated by adding the reconstructed residual signal to the prediction signal output by the prediction unit 560.

The buffer 550 may store therein the reconstructed signal for further reference by the prediction unit 560.

The prediction unit 560 may generate the prediction signal using the previously reconstructed signal stored in the buffer 550. In this case, the present invention relates to efficiently predicting a region in a target image using a region in an anchor image. In this case, the anchor image may refer to a reference image, a reference picture or a reference frame. The efficiency may be determined by calculating a mean square error that quantifies a rate-distortion cost or distortion in the residual signal.

Figure 6:
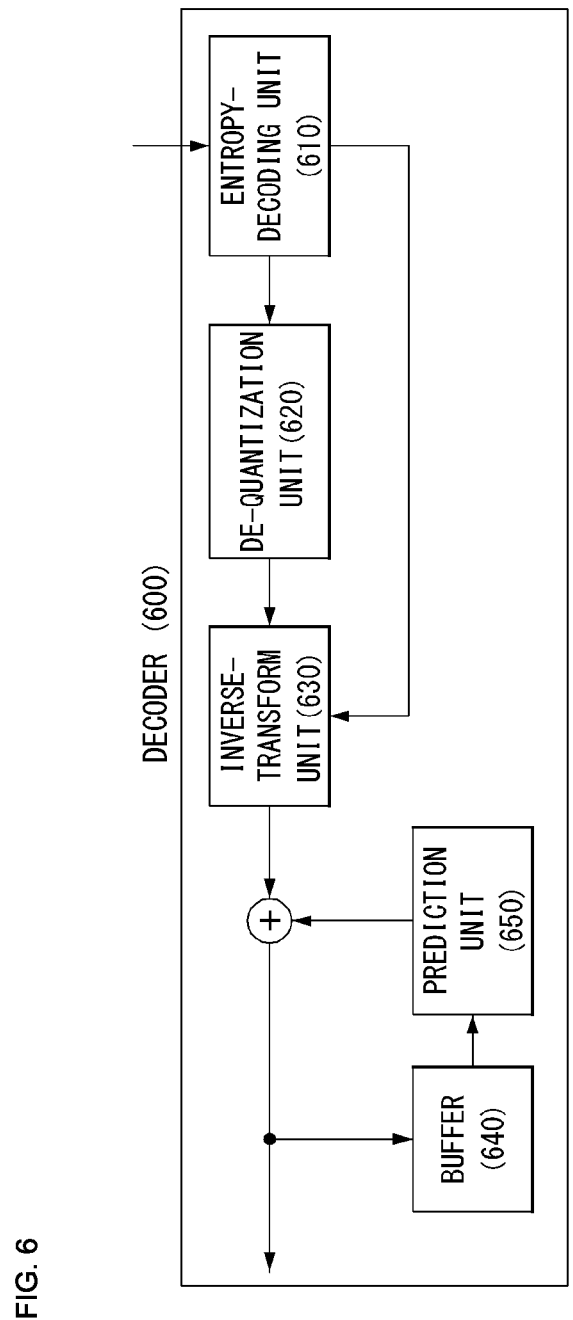
FIG. 6 illustrates a schematic block diagram of a decoder that processes graph-based signals according to one embodiment of the present invention.

FIG. 6 is a schematic block diagram of a decoder which performs graph-based signal processing according to one embodiment of the present invention.

A decoder 600 in FIG. 6 may receive a signal output from the encoder 500 in FIG. 5, and obtain a residual signal from the received signal.

The entropy decoder 610 performs entropy encoding on the residual signal. The de-quantization unit 620 may obtain a transform coefficient from the entropy-decoded signal based on quantization step size information. In this case, the transform coefficient may mean a GBST coefficient.

The inverse transform unit 630 obtains a residual signal by performing inverse transform to the transform coefficient. In this case, the inverse transform may mean an inverse transform of the GBST generated in the encoder 500. The GBST is characterized as being based on line graphs which are obtained by GMRF modeling of rows and columns of the residual signal.

In another embodiment of the present invention, the inverse transform unit 630 may receive a mode index corresponding to a DCT or a GBST, and obtain a graph-based transform kernel corresponding to the mode index. Using the obtained graph-based kernel, it is possible to reconstruct a transform unit. The graph-based transform kernel may represent a GBST based on a line graph having an optimal weight.

The reconstructed signal may be generated by adding the obtained residual signal to a prediction signal which is output from a prediction unit 650.

The buffer 640 stores therein the reconstructed signal for further reference by the prediction unit 650.

The prediction unit 650 generates a prediction signal based on a previously reconstructed signal stored in the buffer 640.

Figure 7:
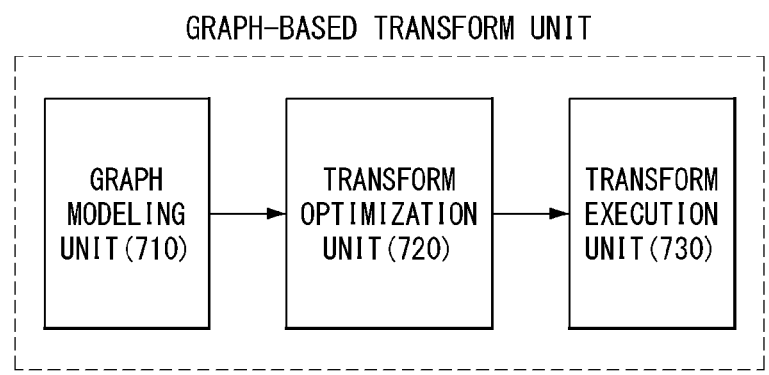
FIG. 7 is an internal block diagram of a graph-based transform unit which performs a graph-based transform according to one embodiment of the present invention.

FIG. 7 is an internal block diagram of a graph-based transform unit which performs graph-based transform according to one embodiment of the present invention.

Referring to FIG. 7, a graph-based transform unit may include a clustering unit (not shown), a graph modeling unit 710, a transform optimization unit 720, and a transform execution unit 730. These units are not necessarily included in an encoder, and information stored in the outside or pre-defined information may be used.

The clustering unit (not shown) may generate at least one data cluster by performing clustering on input video data. In this case, the clustering may be performed based on a prediction mode. For example, when the prediction mode is an intra prediction mode, the at least one data cluster represents an intra residual data for the intra prediction mode. Alternatively, when the prediction mode is an inter prediction mode, the at least one data cluster represents inter residual data for the inter prediction mode.

Figure 8:
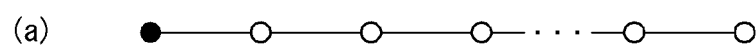
FIG. 8 illustrates one-dimensional GMRF models of an intra prediction or an inter prediction according to one embodiment of the present invention.
Figure 8:
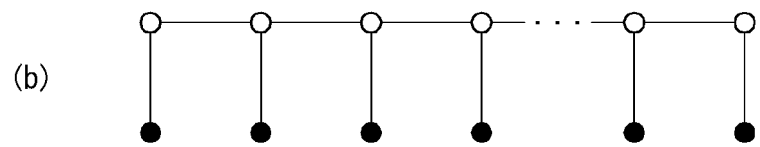

The graph modeling unit 710 may generate multiple graph-based models corresponding data clusters, and generate a graph Laplacian matrix corresponding to the multiple graph-based models. In this case, each of the multiple graph-based models may be generated for the intra prediction mode or the inter prediction mode, and, for example, a one-dimensional GMRF model may be used as shown in FIG. 8.

The transform optimization unit 720 may perform transform optimization based on the multiple graph-based models. The transform optimization will be described in more detail in the following.

Optimality of Graph-Based Transform

It is already well known that a KLT is optimal for orthogonal transform coding of jointly Gaussian sources in terms of Mean Square Error (MSE) under a high rate assumption. Under a specific condition of a GMRF model, a GBT derived based on a generalized graph Laplacian may have the same effect as that of the optimal KLT.

In the case where random vectors $X \in \mathbb{R}^N$ and $y \in \mathbb{R}^M$ are jointly distributed based on attractive GMRF and residual samples are $r=x-\mathbb{E}[s|y]$, if an optimal x is predicted using observed samples y, the GBT derived from the generalized Laplacian is optimal for orthogonal transform coding of a residual vector r at a high bit rate. The attractive GMRF may mean a resultant model of the case where all off-diagonal elements of $J_x$ are not negative in Equation 6 of this specification.

As shown in FIGS. 8(a) and 8(b) described in the following, samples of x and observed samples of y may be jointly modeled based on a attractive GMRF. If residual samples of r are obtained through optimal prediction of x from y, diagonalization of a covariance matrix of r $K_r = \mathbb{E}[rr^t]$ derives $K_r = U\Lambda^{-1}U^t$, wherein columns of U are basis vectors of a KLT.

Equivalently, a KLT may be obtained by diagonalizing a precision matrix $J_r = U\Lambda U^t$. As shown in the following Equation 4, $J_r$ may be expressed in a generalized graph Laplacian form (L=D−A+V), and $(A)_{i,j}=-(J_r)_{i,j}$ and $(V)_{i,i}=\Sigma_{j=1}^N (J_r)_{i,j}$. Thus, a GBT derived based on the generalized graph Laplacian is optimal.

In summary, if a one-dimensional GMRF is attractive, a GBT is optimal for a prediction transform coding. Actually, since it is generally assumed that neighboring samples are correlated as being positive in image signals, the attractive GMRF is a valid model. In intra and inter prediction signal modes which will be discussed later, selecting ρi≥0 for i=0,1, . . . , N−1 or selecting ρ̃i≥0 for i=0,1, . . . , N derives attractive GMRF models. In this case, all prediction matrixes mentioned in the following Equations 13 and 17 have the generalized graph Laplacian form in the above Equation 1.

Graph Learning for Optimal GBST Construction

First, a video signal $r \in \mathbb{R}^N$ may be modeled as in the following Equation 4.

$$p(r|L) = \frac{1}{(2\pi)^{N/2}|L|^{-1/2}} \exp\left(-\frac{1}{2}r^t L r\right) \qquad \text{[Equation 4]}$$

In this case, L denotes a precision matrix having a graph Laplacian form generalized in the above Equation 1. Intra and inter prediction residual models follow a distribution in the above Equation 4. In order to find an optimal generalized graph Laplacian from residual data of the video signal, an optimization problem as in the following Equation 5 may be formulated.

$$\begin{aligned}\underset{w,v}{\text{maximize}} \quad & \log|L| - Tr(LS) \qquad \text{[Equation 5]}\\ \text{subject to} \quad & L = B \text{ diag}(w)B^t + \text{diag}(v) \\ & w \geq 0\end{aligned}$$

In this case, S denotes a sample covariance of a residual signal r, and B denotes an incidence matrix representing a structure of a graph (e.g., a set of graph links).

In the above Equation 5, an objective function may be derived by employing a natural logarithm of likelihood term in the Equation 4, and L may be a generalized graph Laplacian having link weights and self-loop weights which are represented by a vector w and a vector v, respectively.

The construction proposed in the Equation 5 is a convex optimization problem, and it may be solved using a convex optimization tool such as CVX. For example, the present invention may employ a fast block-coordinate descent algorithm to optimally solve this problem.

Construction of Optimal GBST

Regarding construction of a GBST, the optimization problem shown in the above Equation 5 may be solved by optimizing GBTs shown in the above Equation 3 and two different line graphs which define $U_{row}$ and $U_{col}$. Since different transforms are to be designed, each line graph may be optimized independently. Thus, the present invention is capable of finding optimal line graphs based on sample covariance matrixes $S_{row}$ and $S_{col}$ which are generated from rows and columns of residual blocks.

Suppose that GGL(B,S) represent a graph learning problem in the above Equation 5 having an incidence matrix (B) and a covariance matrix (S). Regarding N×N residual blocks, a GBST of the present invention may be constructed in the following steps. However, the present invention is not limited thereto, and the present invention is applicable not just to a square block, but to a non-square block.

First, an encoder may generate an incidence matrix $B_{line}$ representing a line graph. In addition, the encoder may train two sample covariance matrixes $S_{row}$ and $S_{col}$ based on N rows and N columns of residual blocks in a data set.

Then, to determine generalized Laplacian matrixes $L_{row}$ and $L_{col}$, the above Equation 5, a GGL ($B_{line},S_{row}$) and a GGL ($B_{line},S_{col}$) may be solved.

In addition, the encoder may obtain $U_{row}$, and $U_{col}$, which define GBTs defining a GBST as shown in the Equation 3, by performing eigen decomposition on $L_{row}$ and $L_{col}$.

Meanwhile, the transform execution unit 730 may perform a transform using an optimized GBST matrix which is generated as a result of performing the transform optimization.

FIG. 8 illustrates one-dimensional GMRF models of intra prediction or inter prediction according to one embodiment of the present invention.

The present invention proposes a new framework to design a GBST based on an optimal line graph. First, two separable line graphs may be generated based on row-wise and column-wise statistical properties of residual blocks observed in each prediction mode. Then, a GBST may be generated using a GBT corresponding to the two separable line graphs, that is, by applying a GBT generating method to rows and columns of the residual blocks.

With providing a two-dimensional GBST based on a line graph having an optimal weight, the present invention is capable of outdo performance of a two-dimensional DCT and a separable KLT. For example, compared to the separable KLT, a GBST to which the present invention is applied may require learning much less parameters from train data, thereby deriving a more robust transform.

Models for Residual Signals

GMRFs are used to model residual signals, and this provides probabilistic interpretation of a graph-based framework. In the assumption that a random vector of interest $X \in \mathbb{R}^N$ has a zero mean, a GMRF model for x may be defined based on a precision matrix Jx, and x has a distribution as shown in the following Equation 6.

$$p(x) = \frac{1}{(2\pi)^{N/2}|J_x|^{-1/2}} \exp\left(-\frac{1}{2}x^t J_x x\right) \quad \text{[Equation 6]}$$

In this case, |•| denotes the determinant operator. If all off-diagonal elements of $J_x$ are non-positive, the resulting model is called an attractive GMRF.

Referring to FIG. 8, two basis one-dimensional GMRF models for an intra-prediction residual signal and an inter-prediction residual signal are suggested. The main difference between two models in FIGS. 8(a) and 8(b) is the number of reference samples used in prediction. That is, in the case of intra prediction in FIG. 8(a), a single reference sample is used to predict current samples, and, in the case of inter prediction in FIG. 8(b), each sample in a block is predicted using corresponding samples at the same positions in a matching block within a reference frame.

recursive formulation may be used to model residual signals into one-dimensional GMRFs.

$$x_1 = \rho_0(y+d) + e_1 \quad \text{[Equation 7]}$$
$$x_2 = \rho_1 x_1 + e_2$$
$$\vdots$$
$$x_{N-1} = \rho_{N-2} x_{N-2} + e_{N-1}$$
$$x_N = \rho_{N-1} x_{N-1} + e_N$$

In this case, $d \sim \mathcal{N}(0, \sigma^2)$ denotes distortion in the reference sample y, and $e_i \sim \mathcal{N}(0, \sigma^2)$ denotes i.i.d. Gaussian noise in $x_i$ (i=1, ..., N) having a fixed variance $v_e^2$. It is assumed that random variables d and $e_i$ (i=1, ..., N) are independent. Spatial correlation coefficients between samples are expressed by $\rho_0, \rho_1, \ldots, \rho_{N-1}$.

The above Equation 7 may be compressively expressed as Qx=y+d+e, where y, d, e, and Q are the same as in Equations 8 to 11.

$$y = [(\rho_0 y) \; 0 \; \ldots \; 0]^t \quad \text{[Equation 8]}$$

$$d = [(\rho_0 d) \; 0 \; \ldots \; 0]^t \quad \text{[Equation 9]}$$

$$e = [e_1 \; e_2 \; \ldots \; e_N]^t \quad \text{[Equation 10]}$$

$$Q = \begin{bmatrix} 1 & 0 & \ldots & & \ldots & 0 \\ -\rho_1 & 1 & 0 & & & \vdots \\ 0 & -\rho_2 & 1 & \ddots & & \vdots \\ \vdots & \ddots & \ddots & \ddots & \ddots & \vdots \\ \vdots & & \ddots & -\rho_{N-2} & 1 & 0 \\ 0 & \ldots & \ldots & 0 & -\rho_{N-1} & 1 \end{bmatrix} \quad \text{[Equation 11]}$$

In this case, x may be expressed as $X = p + Q^{-1}d + Q^{-1}e$, and $p = Q^{-1}y$ is the optimal prediction for x. Thus, a residual vector r=x−p is obtained, and a covariance matrix thereof is expressed as in Equation 12.

$$K_r = Q^{-1} \mathbb{E}[(e+d)(e+d)^t](Q^{-1})^t \quad \text{[equation 12]}$$

An inverse transform of the covariance matrix provides a prediction matrix $J_r = K_r^{-1}$, as shown in Equation 13, where $$\beta_d = \frac{(\rho_0 \sigma)^2}{\sigma_e^2}.$$

$$J_r = \frac{1}{\sigma_e^2} \begin{bmatrix} \frac{1}{1+\beta_d} + \rho_1^2 & -\rho_1 & 0 & \ldots & & \ldots & 0 \\ -\rho_1 & 1+\rho_2^2 & -\rho_2 & 0 & & & \vdots \\ 0 & -\rho_2 & 1+\rho_3^2 & -\rho_3 & \ddots & & \vdots \\ \vdots & \ddots & \ddots & \ddots & \ddots & \ddots & \vdots \\ \vdots & & & \ddots & -\rho_{N-2} & 1+\rho_{N-1}^2 & -\rho_{N-1} \\ 0 & \ldots & & \ldots & 0 & -\rho_{N-1} & 1 \end{bmatrix} \quad \text{[Equation 13]}$$

Modeling of Intra-Prediction Residual Signal

In the case of modeling an intra-prediction residual signal, a reference sample y is used to predict N number of samples $x = [x_1 \; x_2 \; \ldots \; x_N]^t$. As shown in the following Equation 7, Modeling of Inter-Prediction Residual Signal $y_1, \ldots, y_N$, which are N number of reference samples of a previous frame, may be used to predict N number of samples of $X=[x_1 \ x_2 \ \ldots \ x_N]^t$. Recursive formulation of Equation 14 may model a one-dimensional GMRF.

$$x_1 = \rho_0(y+d) + \tilde{\rho}_1(y_1+d_1) + e_1 \quad \text{[Equation 14]}$$
$$x_2 = \rho_1 x_1 + \tilde{\rho}_2(y_2+d_2) + e_2$$
$$\vdots$$
$$x_{N-1} = \rho_{N-2}x_{N-2} + \tilde{\rho}_{N-1}(y_{N-1}+d_{N-1}) + e_{N-1}$$
$$x_N = \rho_{N-1}x_{N-1} + \tilde{\rho}_N(y_N+d_N) + e_N$$

In this case, $d_i \sim \mathcal{N}(0,\sigma_i^2)$ denotes distortion of a reference sample $y_i$, and $e_i \sim \mathcal{N}(0, \sigma_e^2)$ denotes i.i.d. Gaussian noise in $x_i$ (i=1, ..., N).

A sample y of a neighboring block having distortion of $d \sim \mathcal{N}(0, \sigma^2)$ is part of a GMRF model, but the sample y is not used for prediction because the sample y models inter-prediction residual signals. Furthermore, random variables d, $e_i$, and $d_i$ (i=1, ..., N) are assumed to be independent. In addition to spatial correlation coefficients, $\rho_0, \rho_1, \ldots, \rho_N$, temporal correlation coefficients, which are denoted by $\tilde{\rho}_1, \ldots, \tilde{\rho}_N$, are used in this model.

The above Equation 14 may be expressed in a vector-matrix form such as $Qx=\tilde{y}+\tilde{d}$. In this case, Q is described above in Equation 11 and represents and $\tilde{y}=[(\rho_0 y+\tilde{\rho}_1 y_1)\tilde{\rho}_2 y_2 \ldots \tilde{\rho}_N y_N]^t$ and $\tilde{d}=[(\rho_0 d+\tilde{\rho}_1 d_1)\tilde{\rho}_2 d_2 \ldots \tilde{\rho}_N d_N]^t$.

In addition, X may be expressed as $x=Q^{-1}\tilde{y}+Q^{-1}(\tilde{d}+e)$, and thus, $p=Q^{-1}\tilde{y}$ may represent optimal prediction for X. Therefore, a residual vector may be represented by Equation 15, and a covariance matrix thereof may be represented by Equation 16.

$$\tilde{r}=Q^{-1}(\tilde{d}+e) \quad \text{[Equation 15]}$$

$$K_{\tilde{r}}=Q^{-1}\mathbb{E}[(e+\tilde{d})(e+\tilde{d})^t](Q^{-1})^t \quad \text{[Equation 16]}$$

By performing an inverse transform of a covariance matrix $K_{\tilde{r}}$ the present invention may obtain a precision matrix $J_{\tilde{r}}$ as in Equation 17.

$$J_{\tilde{r}} = \frac{1}{\sigma_e^2} \begin{bmatrix} \frac{1}{1+\gamma_1+\beta_A}+\frac{\rho_1^2}{1+\gamma_2} & \frac{-\rho_1}{1+\gamma_2} & 0 & \cdots & & \cdots & 0 \\ \frac{-\rho_1}{1+\gamma_2} & \frac{1}{1+\gamma_2}+\frac{\rho_2^2}{1+\gamma_3} & \frac{-\rho_2}{1+\gamma_3} & \ddots & & \ddots & \vdots \\ 0 & \ddots & \ddots & \ddots & & \ddots & \vdots \\ \vdots & \ddots & \ddots & \ddots & \frac{-\rho_{N-2}}{1+\gamma_{N-1}} & & 0 \\ \vdots & & \ddots & \frac{-\rho_{N-2}}{1+\gamma_{N-1}} & \frac{1}{1+\gamma_{N-1}}+\frac{\rho_{N-1}^2}{1+\gamma_N} & \frac{-\rho_{N-1}}{1+\gamma_N} \\ 0 & \cdots & & \cdots & 0 & \frac{-\rho_{N-1}}{1+\gamma_N} & \frac{1}{1+\gamma_N} \end{bmatrix} \quad \text{[Equation 17]}$$

In this case, regarding i=1, ..., N, $$\gamma_i = \frac{(\tilde{\rho}_i \sigma_i)^2}{\sigma_e^2} \text{ and } \beta_d = \frac{(\rho_0 \sigma)^2}{\sigma_e^2}.$$

Since y is not used in prediction, it may be assumed that distortion d in y is sufficiently large. That is, $\sigma \gg \sigma_e$ is assumed. Therefore, following approximation holds for $(J_{\tilde{r}})_{1,1}$, a first diagonal entry as Equation 18.

$$(J_{\tilde{r}})_{1,1} = \left(\frac{1}{1+\gamma_1+\beta_d} + \frac{\rho_1^2}{1+\gamma_2}\right) \approx \frac{\rho_1^2}{1+\gamma_2} \quad \text{[Equation 18]}$$

Figure 9:
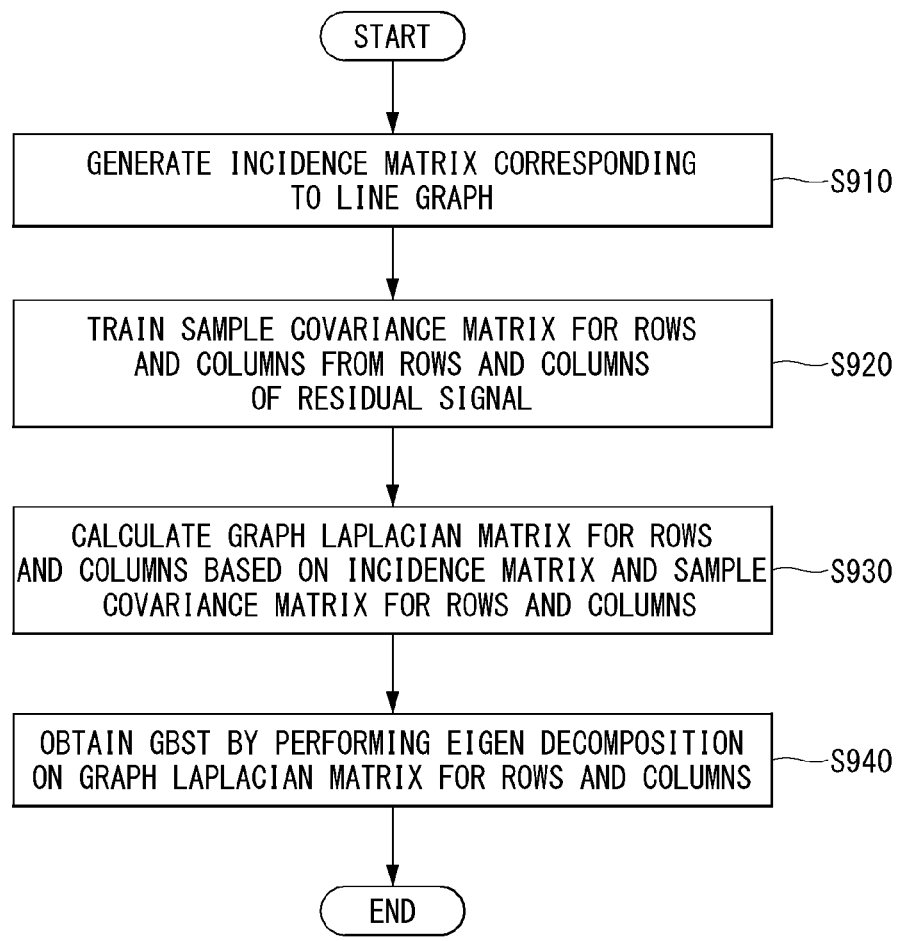
FIG. 9 is a flowchart illustrating a procedure of generating a graph-based separable transform (GBST) based on a line graph having an optimal weight according to one embodiment of the present invention.

FIG. 9 is a flowchart illustrating a procedure of generating a GBST based on a line graph having an optimal weight according to one embodiment of the present invention.

An encoder to which the present invention is applied may generate an incidence matrix corresponding to a line graph (S910). For example, the incidence matrix may correspond to a line graph and may be expressed as Bline.

The encoder may train a sample covariance matrix for rows and columns from rows and columns of a residual signal (S920). For example, it is possible to train two sample covariance matrixes $S_{row}$ and $S_{col}$ from N number of rows and N number of columns of residual blocks.

The encoder may calculate a graph Laplacian matrix for rows and a columns based on the incidence matrix and the sample covariance matrix for the rows and the columns (S930). For example, to determine generalized graph Laplacian matrixes $L_{row}$ and $L_{col}$, the above Equation 5, GGL ($B_{line}, S_{row}$), and GGL($B_{line}, S_{col}$) may be solved.

Figure 10:
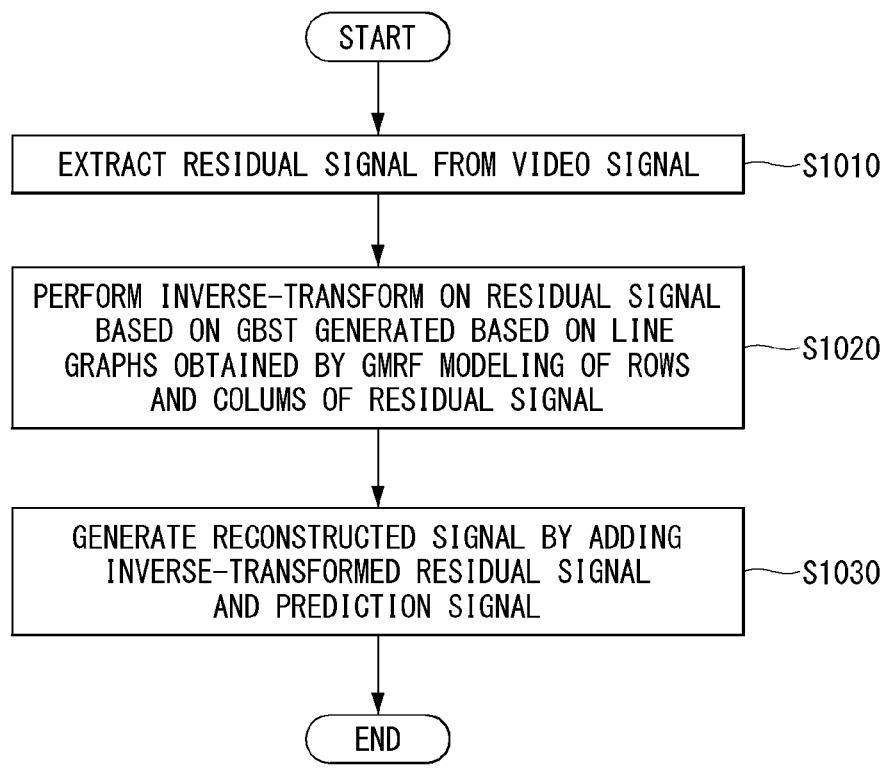
FIG. 10 is a flowchart illustrating a procedure of performing decoding based on a graph-based separable transform (GBST), which is based on a line graph having an optimal weight, according to one embodiment of the present invention.

The encoder may obtain a GBST by performing an eigen decomposition to the graph Laplacian matrix for the rows and the columns (S940). For example, as shown in the above Equation 3, GBTs, $U_{row}$, and $U_{col}$ which define the GBST may be obtained, FIG. 10 is a flowchart illustrating a procedure of performing a decoding based on a GBST, which is based on a line graph having an optimal weight, according to one embodiment of the present invention.

A decoder to which the present invention is applied may extract a residual signal from a video signal (S1010).

The decoder may perform an inverse transform of the residual signal based on a GBST, which is generated based on line graphs (S1020). The line graphs may be obtained through GMRF modeling of rows and columns of the residual signal.

The decoder may generate a reconstructed signal by adding the inverse-transformed residual signal and a prediction signal (S1030).

Figure 11:
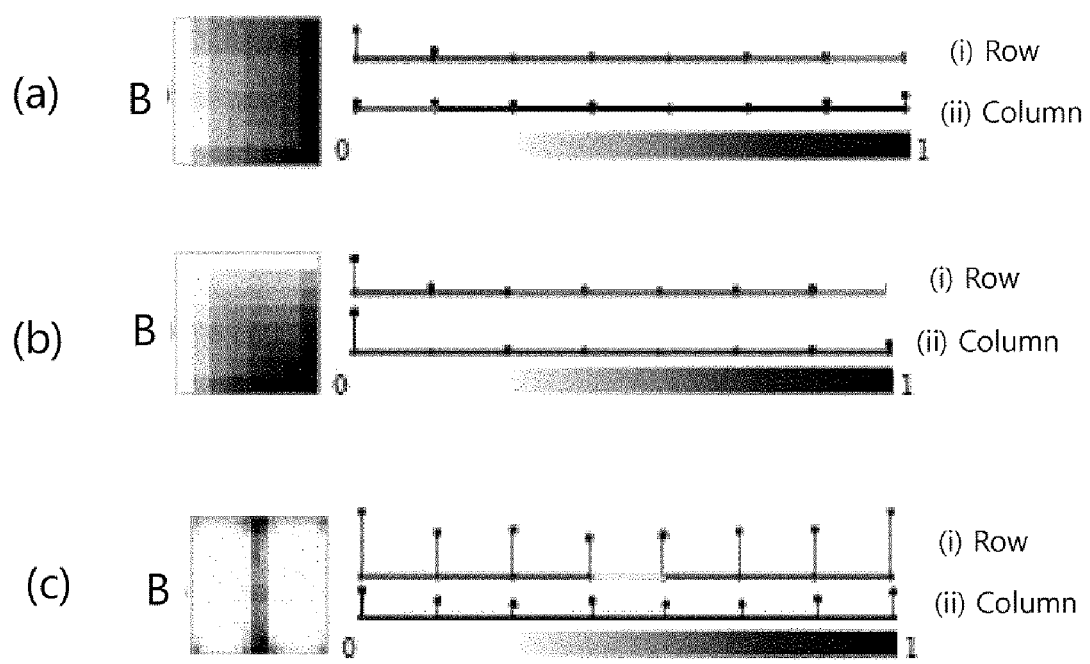
FIG. 11 illustrates graphs optimized for an intra prediction mode and an inter prediction mode according to one embodiment of the present invention.

FIG. 11 illustrates graphs optimized for an intra prediction mode and an inter prediction mode according to one embodiment of the present invention.

FIG. 11(a) illustrates a graph optimized for an intra horizontal mode (mode 10), FIG. 11(b) illustrates a graph optimized for an intra diagonal mode (mode 18), and FIG. 11(c) illustrates a graph optimized for a inter prediction mode of a PU partition whose size is N×2N.

(B) in FIGS. 11(a) to 11(c) indicates a sample variance of pixel values for 8×8 blocks, and a darker color indicates a greater variance.

Optimized graphs relevant to rows and columns of each block are respectively shown in (i) and (ii). Every weight is normalized into a maximum link weight, and a darker-colored link weight represents a greater weight. In FIGS. 11(a) to 11(c), bars attached to nodes represents recursive loops, wherein weights are proportional to lengths of the bars.

Hereinafter, relations between transforms such as GBTs and a KLT, or a DCT and an ADST in the present invention will be described. This description may be applied as being trivially expanded regarding a GBST which is defined using a pair of one-dimensional transforms.

(1) KLT: if the condition described above regarding optimality of a GBT is satisfied, the GBT may be equivalent to a KLT. However, a GBT of the present invention provides a more robust transform than a separable KLT. It is because the KTP requires $\mathcal{O}(N^2)$ while the GBT requires only $\mathcal{O}(N)$ to learn a relevant one-dimensional model. Therefore, the present invention provide a much batter generalization for learning a signal mode, which makes it possible to design a robust transform.

(2) DCT and ADST: It is already well known that a one-dimensional DCT approximates a KLT when an underlying signal model is a one-dimensional GMRF. Accordingly, the one-dimensional DCT may be obtained by eigen decomposition of combinational Laplacian of a uniformly weighted line graph. A one-dimensional ADST is a GBT derived from a generalized graph Laplacian which are derived from a generalized graph Laplacian as the same as $w_u$, wherein the one-dimensional ADST has a single recursive-loop in the first sample with a weight of $(V)_{1,1}=w_u$. Based on such results, if $\rho_i \rightarrow 1$ is assumed for, i=0,1, . . . , N−1, a GBT may be derived as below.

For example, (i) if $\sigma \gg \sigma_e$ is satisfied for the intra prediction model of Equation 7, the GBT may be derived into a one-dimensional DCT, (ii) if $\sigma \ll \sigma_e$ is satisfied for the intra prediction mode of Equation 7, the GBT may be derived into a one-dimensional ADST, and (iii) if $\gamma_1 = \ldots = \gamma_N$ is satisfied for the inter prediction model of Equation 14, the GBT may be derived into a one-dimensional DCT.

In addition, in Equations 13 and 17, it is found that, regarding intra prediction, better prediction (that is, a smaller σ) generates a greater recursive-loop in a sample adjacent to a reference sample. This potentially derives a GBT approximate to an ADST. On the contrary, bad prediction generates a small recursive-loop weight.

Therefore, an optimal GBT may be approximate to the ADST or the DCT depending on prediction quality. In inter prediction, multiple reference samples affect a recursive-loop weight at each position. In deed, prediction quality is similar over samples (that is, $\sigma_1 \approx \ldots \approx \sigma_N$), and an optimal transform is generally approximate to a DCT rather than a ADST.

To show performance of a GBST of the present invention compared to a separable KLT and a two-dimensional DCT, a mode-dependent transforms coding scheme which is provided using a different transform matching with a class of residual blocks, may be employed.

For example, residual block data may be obtained from a different video sequence using a HEVC reference software (HM version 14), and then two additional data sets for training and test may be generated. For example, in the case of a training data set, residual blocks are obtained from 6 different video sequences having resolution of 704×576. In the case of a test data set, residual blocks are collected from two video sequences having resolution of 832×480.

Residual blocks in every data set may be classified based on additional information provided by an encoder. In particular, intra-prediction blocks may be classified based on 35 intra prediction modes. Similarly, inter-prediction blocks are classified into 7 different classes using prediction unit (PU) partitions. For example, two square PU partitions may be grouped into one class, and other six PU partitions may be determined to be a different class. Therefore, there are 35+7=42 classes in total.

Regarding each class and block size, an optimal GBST may be constructed using a training data set. As optimal transforms are applied in all data sets in association with residual blocks, transform coefficients are quantized and then entropy-encoded using arithmetic coding.

Referring to FIG. 11, there are illustrated examples of weighted line graphs which are optimized for two intra prediction modes and one inter prediction partition. It is found that a weight of a recursive-loop is greater in pixels connected to a reference sample.

In the case of FIG. 11(a), one graph relevant to rows has a great recursive loop in the first pixel, while the other graph does not has a dominant recursive-loop weight.

In the case of FIG. 11(b), two graphs have a great recursive-loop weight in the first nodes thereof.

Meanwhile, in FIG. 11(c), a recursive-loop weight generally has a great value at each node due to inter prediction. Furthermore, since PU division is vertical, a graph corresponding columns has a small link weight in the middle part.

FIG. 12 is a table in which a separable KLT and a graph-based separable GBST are compared with respect to residual signals of intra prediction and inter prediction according to one embodiment of the present invention.

Referring to FIG. 12, there are illustrated compression results in light of BD-rate (Bjøntegaard delta rate) and BD-PSNR (Peak signal-to-noise ratio) matrix.

FIG. 12 shows coding performance of a separable KLT and a GBST of the present invention with respect to intra and inter-prediction residuals, and each performance is a result of comparison with the case of applying transform coding in HEVC (in HEVC, a two-dimensional DCT is applied to all blocks except 4×4 intra prediction blocks which have been encoded using a two-dimensional ADST).

Regarding an intra prediction coding and an inter prediction coding, a GBST of the present invention outdoes a separable KLT when it comes to a test data set and shows similar performance when it comes to a training data set. This positively shows that the GBST provides a more robust and better generalization compared to the separable KLT.

FIG. 13 is a table in which a hybrid DCT/ADST and a GBST are compared in terms of coding performance with respect to a residual signal of intra prediction according to one embodiment of the present invention.

Referring to FIG. 13, there are illustrated a comparison result of performance of the GBST and a hybrid DCT/ADST. These are applied to 4×4 blocks which are predicted using only vertical, horizontal, and DC modes.

The result of FIG. 13 shows a BD gain regarding a two-dimensional DCT. It is found that a GBST of the present invention outdoes the hybrid DCT/ADST when it comes to all data sets.

As described above, the present invention has described GBSTs and graph learning for optimal design of the GBSTs. Two GMRF models for intra and inter-prediction residuals have been proposed, and it has been proved that GBTs are optimal when residual signals follow attractive GMRF models. The cases where the GBSTs are simplified into a well-known transform such as a DCT and an ADST have been described, and it has been proved in FIGS. 12 and 13 that results of tests to which the present invention is applied outdo a KLT and a hybrid DCT/ADST in terms of compression performance.

The embodiments in this specification are described mainly on the basis of an encoder, but the present invention is not limited thereto. Each function unit in a transform unit or a graph-based transform unit may be implemented even in a decoder as well as the encoder, and, in this case, all function units in the transform unit or the graph-based transform unit described with reference to the above embodiments are not necessarily included in the decoder: some of them may be included in the decoder or information stored in the outside or predefined information in the encoder/decoder may be used.

As described above, the embodiments explained in the present invention may be implemented and performed in a processor, a micro-processor, a controller or a chip. For example, the functional modules explained in FIGS. 1, 2 and 5 to 7 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method for encoding a video signal based on a graph-based separable transform(GBST) by an apparatus, the method comprising:
generating prediction data for a current block;
generating residual data by subtracting the prediction data from an original data of the current block;
performing a transform on the residual data to obtain transform coefficients; and
performing a quantization and an entropy encoding on the transform coefficients,
wherein a step of performing the transform on the residual data includes
generating an incidence matrix corresponding to a line graph;
training a sample covariance matrix for a row and a column from a row and a column of the residual data;
calculating a graph Laplacian matrix for a row and a column based on the incidence matrix and the sample covariance matrix for the row and the column; and
obtaining the GBST by performing an eigen decomposition to the graph Laplacian matrix for the row and the column.

2. The method of claim 1, wherein the graph Laplacian matrix for the row and the column is defined by a link weighting parameter and a recursive loop parameter.

3. The method of claim 1, wherein two different Gaussian Markov Random fields (GMRFs) are used for modeling of inter residual data and intra residual data.

4. The method of claim 3, wherein, in the case of the intra residual data, a one-dimensional GMRF comprises at least one of a distortion component of a reference sample, a Gaussian noise component of a current sample, or a spatial correlation coefficient.

5. The method of claim 3, wherein, in the case of the inter residual data, a one-dimensional GMRF comprises at least one of a distortion component of a reference sample, a Gaussian noise component of a current sample, a temporal correlation coefficient, or a spatial correlation coefficient.

6. A method for decoding a video signal based on a graph-based separable transform (GBST) by an apparatus, the method comprising:
obtaining residual data from the video signal;
performing an inverse-transform on the residual data based on the GBST; and
generating a reconstruction signal based on the residual signalresidual data and prediction data,
wherein the GBST represents a graph-based transform generated based on two separable line graphs, which are obtained by a Gaussian Markov Random Field (GMRF) modelling of a row and a column of the residual data,
wherein the two separable line graphs have been generated based on row-wise and column-wise statistical properties of residual data in each prediction mode, and
wherein the GBST has been generated by performing an eigen decomposition to a graph Laplacian matrix based on an incidence matrix and a sample covariance matrix for the row and the column.

7. An apparatus for decoding a video signal based on a graph-based separable transform (GBST), the apparatus comprising:
a processor configured to
obtain residual data from the video signal;
perform an inverse transform on the residual data based on the GBST; and
generate a reconstruction signal based on the residual data and prediction data,
wherein the GBST corresponds to a graph-based transform generated based on two separable line graphs, which are obtained by GMRF modeling of a row and a column of the residual data, wherein the two separable line graphs have been generated based on row-wise and column-wise statistical properties of residual data in each prediction mode, and wherein the GBST has been generated by performing an eigen decomposition to a graph Laplacian matrix based on an incidence matrix and a sample covariance matrix for the row and the column.

8. A non-transitory computer-readable medium storing video information generated by performing the steps of:

generating prediction data for a current block;

generating residual data by subtracting the prediction data from an original data of the current block;

performing a transform on the residual data to obtain transform coefficients; and performing a quantization and an entropy encoding on the transform coefficients, wherein a step of performing the transform on the residual data includes generating an incidence matrix corresponding to a line graph;

training a sample covariance matrix for a row and a column from a row and a column of the residual data;

calculating a graph Laplacian matrix for a row and a column based on the incidence matrix and the sample covariance matrix for the row and the column; and obtaining a graph-based separable transform(GBST) by performing an eigen decomposition to the graph Laplacian matrix for the row and the column.

* * * * *